(12) United States Patent
Smith et al.

(10) Patent No.: US 9,854,818 B2
(45) Date of Patent: Jan. 2, 2018

(54) YOGURT WHEY AND METHOD

(71) Applicant: General Mills, Inc., Minneapolis, MN (US)

(72) Inventors: Erika B. Smith, Maple Grove, MN (US); Wenyi Wang, Blaine, MN (US); Vikramaditya Ghosh, Shoreview, MN (US)

(73) Assignee: General Mills, Inc., Minneapolis, MN (US)

( * ) Notice: Subject to any disclaimer, the term of this patent is extended or adjusted under 35 U.S.C. 154(b) by 514 days.

(21) Appl. No.: 14/138,597

(22) Filed: Dec. 23, 2013

(65) Prior Publication Data

US 2014/0348993 A1    Nov. 27, 2014

Related U.S. Application Data

(63) Continuation of application No. PCT/US2013/042576, filed on May 24, 2013.

(51) Int. Cl.
*A23C 21/10* (2006.01)
*A23J 1/20* (2006.01)

(52) U.S. Cl.
CPC .................. *A23C 21/10* (2013.01); *A23J 1/20* (2013.01)

(58) Field of Classification Search
USPC ........................................................ 426/334
See application file for complete search history.

(56) References Cited

U.S. PATENT DOCUMENTS

| | | | |
|---|---|---|---|
| 1,763,633 A * | 6/1930 | Simmons ...................... 426/471 |
| 2,128,845 A * | 8/1938 | Myers et al. .................. 514/251 |
| 2,555,514 A * | 6/1951 | Sharp et al. ................... 426/583 |
| 4,497,836 A * | 2/1985 | Marquardt et al. ............ 426/239 |
| 6,475,539 B1 * | 11/2002 | DeWille et al. ................ 426/72 |
| 2004/0161514 A1 | 8/2004 | Akashe et al. |
| 2005/0276904 A1 | 12/2005 | Brown et al. |
| 2011/0217416 A1 | 9/2011 | Christensen et al. |
| 2011/0287147 A1 | 11/2011 | Pannell et al. |

FOREIGN PATENT DOCUMENTS

| | | | |
|---|---|---|---|
| GB | 534214 | * 3/1941 | ............ A23C 21/00 |
| WO | WO 2009/004566 A2 | 1/2009 | |
| WO | WO 2009/147157 A1 | 12/2009 | |
| WO | WO 2010/045025 A1 | 4/2010 | |
| WO | WO 2011/003426 A2 | 1/2011 | |
| WO | WO 2011 099876 A1 | 8/2011 | |
| WO | WO 2013/163659 A1 | 10/2013 | |

OTHER PUBLICATIONS

Alonso et al. "Residual yoghurt whey for lactic acid production" 2010 Biomass and Bioenergy vol. 34 pp. 931-938.*
Salad in a Jar Sep. 14, 2011 "18 Ways to Use Whey—a By-Product of Greek Yogurt" https://web.archive.org/web/20110925011413/http://www.salad-in-a-jar.com/recipes-with-yogurt/18-ways-to-use-whey-a-by-product-of-greek-yogurt.*
Butler, "Is Greek Yogurt Better Than Regular?" [online]. MotherJones, [retrieved on Dec. 20, 2013]. Retrieved from the Internet:<URL:www.motherjones.com/blue-marble/2010/06/greek-yogury-better-regular>; 2 pgs.
International Search Report/Written Opinion dated Jul. 31, 2013, in the PCT, Patent Application No. PCT/US2013/042576, filed May 24, 2013.

* cited by examiner

*Primary Examiner* — Felicia C Turner
(74) *Attorney, Agent, or Firm* — Diederiks & Whitelaw, PLC; Annette M. Frawley, Esq.

(57) ABSTRACT

A method includes neutralizing yogurt whey with a basic material to form a neutralized yogurt whey having a pH of at least 6.0 and removing water from the neutralized yogurt whey to form a yogurt whey concentrate. Neutralized yogurt whey compositions and concentrates are also described.

15 Claims, No Drawings

YOGURT WHEY AND METHOD

RELATED APPLICATION

The present application is a continuation application of International Application No. PCT/US2013/042576, titled YOGURT WHEY AND METHOD, filed on May 24, 2013, which is hereby incorporated by reference in its entirety.

BACKGROUND

Separated yogurt production produces about two pounds of whey for every pound of yogurt produced. The whey by-product produced from yogurt is a relatively new by-product resulting from the recent popularity of separated yogurt quite often referred to as "Greek" yogurt. Traditional yogurt production via cup set or stirred-style vat set processes does not produce a yogurt whey by-product stream. Additionally, yogurt whey is unlike whey produced from cheese manufacturing. Yogurt whey contains less solids and is more acidic than whey produced from the production of cheese. In contrast, sweet whey is manufactured during the production of rennet types of hard cheese like cheddar or Swiss cheese and has a higher solids content and lower acidity. Acid whey is produced during the production of acid types of cheese such as cottage cheese, and contains a higher solids content than yogurt whey. Currently, yogurt whey is used as an agricultural liquid fertilizer. This liquid yogurt whey does not have suitable characteristics for use in processed foods and animal feed, like other whey by-products.

SUMMARY

The present disclosure relates to a neutralized yogurt whey product and methods of producing the same. In particular the present disclosure relates to neutralizing and concentrating yogurt whey to form a whey product that is useful as a food additive, for example.

In one illustrative embodiment, a method includes neutralizing yogurt whey with a basic material to form a neutralized yogurt whey having a pH of at least 6.0 and removing water from the neutralized yogurt whey to form a yogurt whey concentrate.

In another illustrative embodiment, a method includes neutralizing yogurt whey with a basic material to form a neutralized yogurt whey having a pH of at least 6.0 and pasteurizing the yogurt whey or neutralized yogurt whey. Water is removed from the neutralized yogurt whey to form a yogurt whey concentrate. The yogurt whey concentrate can then be incorporated into a food product.

In another illustrative embodiment, a neutralized yogurt whey composition has a pH of 6.0 or greater, at least 100 mg calcium per 100 g of yogurt whey, at least 0.5% wt galactose, and at least 6% wt solids.

These and various other features and advantages will be apparent from a reading of the following detailed description.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

The term "yogurt whey" refers to the acid whey separation byproduct generated from the traditional method of making Greek yogurt. Yogurt whey is a dilute, acidic liquid containing carbohydrates, milk minerals, protein and cultures.

The present disclosure relates to a neutralized yogurt whey product and methods of producing the same. In particular the present disclosure relates to neutralizing and concentrating yogurt whey to form a whey product that is useful as a food additive, for example. The yogurt whey can be pasteurized, neutralized and concentrated to form a food bulking agent or food additive. In many embodiments the yogurt whey is neutralized with calcium hydroxide to form a calcium enriched product. The yogurt whey is neutralized to a pH of at least 6.0. The whey product can be concentrated to any useful level. In many embodiments the product is dried to a free flowing solid having a moisture content of less than 5% wt or less than 3% wt. In some embodiments the product is concentrated to a solids % in a range from about 20% wt to 90% wt. While the present disclosure is not so limited, an appreciation of various aspects of the disclosure will be gained through a discussion of the examples provided below.

Acid whey or yogurt whey is generated in the food industry as a by-product of the traditional method to make Greek yogurt which involves a whey separation process. The resulting whey by-product is a dilute, high acid liquid containing lactose and milk minerals and is referred to herein as "yogurt whey". Greek yogurt is produced by the fermentation of milk with yogurt cultures. Three pounds of milk produces one pound of Greek Yogurt and two pounds of acid or yogurt whey. Greek yogurt is separated from yogurt whey and the Greek yogurt is then packaged into containers or further processed.

This disclosure describes a method for neutralization and drying the yogurt whey into a powder or liquid concentrate that can be used as a bulking agent, as well as a mineral fortificant (calcium and phosphorus) for food products. The separated yogurt whey is pasteurized, concentrated and neutralized with a basic material.

In some embodiments the neutralized liquid or powder concentrate product can replace sweet whey in food products, for example. Applicant has discovered no significant sensory differences between 10% wt solutions of sweet whey and the neutralized yogurt whey. In addition, the color of neutralized yogurt whey was more similar to sweet whey than whey permeate. Sweet whey and neutralized yogurt whey have similar opacity and whiteness.

Yogurt whey that is separated from Greek yogurt includes a relatively large number of yogurt cultures or colony forming units of yogurt cultures. The yogurt cultures used to form Greek yogurt are *Lactobacillus delbrueckii* subsp. *bulgaricus* and *Streptococcus thermophilus* bacteria, among others. In many embodiments, yogurt cultures are present in the yogurt whey.

Yogurt whey has a pH that is more acidic than whey produced from cheese (i.e., sweet whey). The pH of yogurt whey can be less than 5.0 or less than 4.8 or 4.5 or less. The pH of yogurt whey can be in a range from 4.0 to 5.0 or from 4.3 to 4.8 or from 4.4 to 4.6. Another way to describe acidity is "titratable acidity" or TA which refers to a total acidity and is expressed as %. Titratable acidity can be determined for yogurt whey by titration with a 0.1 N NaOH solution to a 8.2-8.4 pH using phenolphthalein indicator. Yogurt whey has a TA that is greater than a TA of sweet whey. The TA of yogurt whey is at least about 0.2% or at least 0.3% or at least 0.4%. The TA of yogurt whey can be in a range from 0.2 to 0.5% or from 0.3 to 0.5%.

Yogurt whey that has just been separated from Greek yogurt has a solids content of less than 10% wt or less than 8% wt or about 6% wt. Yogurt whey can have a solids wt % in a range from 3 to 9% wt or from 4 to 8% wt or from 5 to 6% wt.

Yogurt whey has a wt % of protein that is less than whey produced from cheese (i.e., sweet whey). Sweet whey can have about 0.8% wt protein. Yogurt whey has less than 0.5% wt or less than 0.4% wt or about 0.3% wt protein. Yogurt whey can have a protein wt % in a range from 0.1 to 0.5% wt or from 0.2 to 0.4% wt.

Yogurt whey has more calcium than whey produced from cheese (i.e., sweet whey). Yogurt whey has at least two times or at least three times or at least 4 times the amount of calcium as sweet whey. Yogurt whey can have about 100 mg or more calcium per 100 g of yogurt whey. Yogurt whey contains calcium in a range from 100 to 150 mg per 100 g yogurt whey.

Yogurt whey has galactose while sweet whey typically does not contain galactose. Yogurt whey can have at least 0.4% wt galactose or at least 0.5% wt galactose. Yogurt whey contains an amount of lactose that is similar to sweet whey. Yogurt whey and sweet whey contains about 70% wt lactose on a dry basis or is in a range from 50 to 75% wt lactose on a dry basis.

Yogurt whey is pasteurized, concentrated and neutralized with a basic material. These processing steps can be performed in any order. For example the yogurt whey can be first pasteurized, then concentrated and then neutralized and optionally further dried to a powder. In other embodiments, the yogurt whey can be first neutralized, then pasteurized and then concentrated and optionally further dried to a powder. In some embodiments, the yogurt whey can be first concentrated, then neutralized and then pasteurized and optionally further dried to a powder.

Neutralizing the yogurt whey is accomplished with an addition of a basic material to form a neutralized yogurt whey. The neutralized yogurt whey has a pH that is greater than 5.0 or greater than 5.5 or greater than 6.0 or greater than 6.2. In many embodiments the neutralized yogurt whey has a pH in a range from about 6.0 to 6.5. The basic material can be any useful basic material. In many embodiments the basic material is a hydroxide such as alkali metal hydroxides or alkali earth metal hydroxides. Alkali metal hydroxides include sodium and potassium hydroxide. Alkali earth metal hydroxides include calcium and magnesium hydroxide. In some embodiments the basic material is a carbonate such as sodium bicarbonate.

Yogurt whey can be concentrated by removing water to any useful solids % or moisture content. The concentrated yogurt whey can be a liquid concentrate or a powder concentrate depending on the amount of water removed from the yogurt whey. Water can be removed by any useful method such as filtration or evaporation. In some embodiments water is removed by membrane separation techniques such as reverse osmosis, nanofiltration or ultrafiltration, for example. Yogurt whey concentrates can have a solids % in a range from about 20% wt to 90% wt. Yogurt whey concentrates can be pumped or transported in some embodiments have been neutralized (having a pH of greater than 5.0 or greater than 5.5 or greater than 6.0) and in other embodiments have not been neutralized (having a pH of less than 5.0).

Concentrated and neutralized yogurt whey can be dried utilizing any useful drying method. In many embodiments the yogurt whey can be dried with a drum dryer, an oven dryer, a freeze dryer, or any other known drying equipment or process. In many embodiments the dried yogurt whey is a yogurt whey powder having a moisture content of 5% wt or less, or 3% wt or less.

In embodiments, the concentrated and neutralized yogurt whey can be dried utilizing spray drying. Surprisingly it is found that when the concentrated and neutralized yogurt whey has a pH of about 6 or greater, the spray dried neutralized yogurt whey forms a free flowing powder.

In many embodiments, yogurt whey concentrated or powdered compositions have a pH of 6.0 or greater, at least 2% wt calcium, at least 0.5% wt galactose and at least 6% wt solids or a pH of 6.2 or greater, at least 3% wt calcium, at least 5% wt galactose and less than 5% protein.

In many embodiments, yogurt whey powdered compositions (that are neutralized) have at least 2% wt calcium, at least 5% wt galactose, less than 5% wt protein and a moisture content of 5% wt or less or 3% wt or less. In many embodiments, yogurt whey powdered compositions (that are neutralized) have at least 3% wt calcium, at least 5% wt galactose, less than 5% wt protein and a moisture content of 5% wt or less or 3% wt or less. Yogurt whey and sweet whey contains about 70% wt lactose on a dry basis or is in a range from 50 to 75% wt lactose on a dry basis.

The concentrated yogurt whey or yogurt whey powder can be incorporated into a food product. The concentrated yogurt whey or yogurt whey powder can be utilized as food product bulking agent, sweetening agent and nutrient fortificant.

EXAMPLES

A yogurt whey sample from the production of Greek yogurt was characterized and compared to a typical sweet whey product as described in Dried Dairy Handbook, WI Center for Dairy Research, Smith, Karen. The results of this analysis is shown in the Table 1 below.

TABLE 1

|  | Sweet Whey 12.5% solids | Yogurt Whey 5.5% solids |
| --- | --- | --- |
| pH | 6.2 | 4.5 |
| Fat % | 0.3 | 0.03 |
| Protein % | 0.8 | 0.11 |
| Carbs % | 4.8 | 3.9 |
| Moisture % | 3.8 | 1.6 |
| Ash % | 0.5 | 0.64 |
| Lactose % | 4.8 | 3.4 |
| Galactose % | 0 | 0.5 |
| Ca mg/100 g | 45 | 120 |

TABLE 1-continued

|  | Sweet Whey 12.5% solids | Yogurt Whey 5.5% solids |
|---|---|---|
| P mg/100 g | 45 | 61 |
| Total Acidity | 0.10 | 0.44 |

This yogurt whey was concentrated to about 35% wt solids in an evaporator and then pasteurized and neutralized with a 10% solution of calcium hydroxide ($Ca(OH)_2$) to pH targets of 5.5, 6.0, 6.25 and 6.5. Each of these samples were then dried to less than 3% wt moisture. The samples that were neutralized to a pH of 6.0, 6.25 and 6.5 were found to be free flowing powders. It was surprising that the samples that were neutralized to a pH of 6.0, 6.25 and 6.5 were found to be free flowing powders while the sample neutralized to a pH of 5.5 was not a free flowing powder.

The 6.5 pH sample (referred to as "Neutralized Yogurt Whey") was characterized against typical sweet whey and typical whey permeate. The results of this characterization is illustrated in Table 2 below.

TABLE 2

|  | Sweet Whey Dry basis | Whey Permeate Dry basis | Neutralized Yogurt Whey Dry basis |
|---|---|---|---|
| pH | 6.0 | 6.0 | 6.5 |
| Fat % | 1.0 | 0.10 | 0.26 |
| Protein % | 12 | 3.6 | 4.2 |
| Carbs % | 73 | 86 | 77 |
| Moisture % | 3.8 | 1.6 | 2.8 |
| Ash % | 7.3 | 8.2 | 16 |
| Lactose % | 65 | 87 | 53 |
| Galactose % | 0 | 0 | 7.0 |
| Ca % | 0.58 | 0.36 | 3.5 |
| P % | 0.63 | 0.57 | 1.1 |

Thus, embodiments of NEUTRALIZED WHEY AND METHOD are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method comprising:
   neutralizing yogurt whey with a basic material to form a neutralized yogurt whey having a pH of at least 6.0; and
   removing water from the neutralized yogurt whey to form a yogurt whey concentrate having less than 5% wt protein on a dry basis.

2. The method according to claim 1, wherein the yogurt whey is neutralized with calcium hydroxide or magnesium hydroxide.

3. The method according to claim 1, further comprising pasteurizing the yogurt whey or neutralized yogurt whey.

4. The method according to claim 1, wherein the yogurt whey concentrate has a solids content of about 20% wt or greater.

5. The method according to claim 1, wherein the yogurt whey concentrate has a moisture content of about 5% wt or less.

6. The method according to claim 1, wherein the neutralized yogurt whey has a pH of about 6.2 or greater.

7. The method according to claim 1, wherein the removing water step comprises a membrane separation step.

8. The method according to claim 1, wherein the removing water step comprises drying.

9. The method according to claim 1, further comprising incorporating the yogurt whey concentrate into a food product.

10. The method according to claim 1, wherein the yogurt whey has a solids content of less than about 8% wt and a pH of about 4.8 or less.

11. A method comprising:
    neutralizing yogurt whey with a basic material to form a neutralized yogurt whey having a pH of at least 6.0;
    pasteurizing the yogurt whey or neutralized yogurt whey;
    removing water from the neutralized yogurt whey to form a yogurt whey concentrate or powder having less than 5% wt protein on a dry basis; and
    incorporating the yogurt whey concentrate or powder into a food product.

12. The method according to claim 11, wherein the yogurt whey is neutralized with calcium hydroxide.

13. The method according to claim 11, wherein the neutralized yogurt whey has a pH of about 6.2 or greater.

14. The method according to claim 11, wherein the yogurt whey concentrate has a solids content of about 20% wt or greater.

15. The method according to claim 11, wherein the yogurt whey powder has a moisture content of about 5% wt or less.

* * * * *